United States Patent
Pang et al.

(10) Patent No.: US 10,249,160 B2
(45) Date of Patent: Apr. 2, 2019

(54) SYSTEM AND WORKSTATION FOR, AND METHOD OF, DETERRING THEFT OF A PRODUCT ASSOCIATED WITH A TARGET TO BE ELECTRO-OPTICALLY READ

(71) Applicant: SYMBOL TECHNOLOGIES, LLC, Lincolnshire, IL (US)

(72) Inventors: Robert J. Pang, Williston Park, NY (US); Christopher J. Fjellstad, Smithtown, NY (US); Thomas Lackemann, Sayville, NY (US); John E. Britts, Port Jefferson Station, NY (US); David R. Turturro, Farmingville, NY (US)

(73) Assignee: Symbol Technologies, LLC, Holtsville, NY (US)

(*) Notice: Subject to any disclaimer, the term of this patent is extended or adjusted under 35 U.S.C. 154(b) by 0 days.

(21) Appl. No.: 15/362,126

(22) Filed: Nov. 28, 2016

(65) Prior Publication Data

US 2018/0151042 A1   May 31, 2018

(51) Int. Cl.
| | | |
|---|---|---|
| *G08B 13/24* | (2006.01) | |
| *G07G 3/00* | (2006.01) | |
| *G08B 13/00* | (2006.01) | |
| *G06K 7/10* | (2006.01) | |

(52) U.S. Cl.
CPC ......... *G08B 13/246* (2013.01); *G06K 7/1096* (2013.01); *G07G 3/003* (2013.01); *G08B 13/00* (2013.01)

(58) Field of Classification Search
CPC .................................................. G08B 13/246
USPC ....................................................... 340/572.1
See application file for complete search history.

(56) References Cited

U.S. PATENT DOCUMENTS

| | | | | |
|---|---|---|---|---|
| 5,594,228 | A * | 1/1997 | Swartz | G06K 7/10 235/383 |
| 5,747,784 | A * | 5/1998 | Walter | A47F 9/048 235/383 |
| 6,236,736 | B1 * | 5/2001 | Crabtree | G01S 3/7865 235/383 |
| 8,421,604 | B2 * | 4/2013 | Bellows | G06K 7/0008 340/12.26 |
| 2007/0058040 | A1 | 3/2007 | Zhang et al. | |
| 2009/0001166 | A1 * | 1/2009 | Barkan | G06K 7/10722 235/462.14 |
| 2009/0134221 | A1 | 5/2009 | Zhu et al. | |
| 2010/0059589 | A1 | 3/2010 | Goncalves et al. | |

(Continued)

OTHER PUBLICATIONS

International Search Report and Written Opinion for International Patent Application PCT/US2017/058513 dated Jan. 4, 2018.

*Primary Examiner* — Omar Casillashernandez
(74) *Attorney, Agent, or Firm* — Yuri Astvatsaturov

(57) ABSTRACT

Successive products associated with targets to be electro-optically read are swiped, in their respective turns, past a window in a point-of-transaction workstation. A motion detector detects movement of each product. A reader electro-optically reads a target associated with each moving product. If the target associated with each moving product has not been read, then this event is deemed suspicious, and the event is flagged for a security investigation designed to deter product theft by sweethearting.

16 Claims, 5 Drawing Sheets

(56) References Cited

U.S. PATENT DOCUMENTS

2014/0263644 A1* 9/2014 Handshaw ......... G06K 7/10801
 235/440

* cited by examiner

SYSTEM AND WORKSTATION FOR, AND METHOD OF, DETERRING THEFT OF A PRODUCT ASSOCIATED WITH A TARGET TO BE ELECTRO-OPTICALLY READ

BACKGROUND OF THE INVENTION

The present disclosure relates generally to a system and a workstation for, and a method of, deterring theft of a product associated with a target to be electro-optically read, and, more particularly, to discouraging a criminal practice known in retailing as "sweethearting" in which product theft by a retail employee occurs at the workstation.

Point-of-transaction workstations employing laser-based readers and/or imager-based readers have been used in many venues, such as supermarkets, department stores and other kinds of retail settings, for many years. In authorized usage, a retail employee slides or swipes a product associated with, or bearing, a target, such as a bar code symbol, in a moving direction across and past a window of the workstation. The readers electro-optically read the associated target over a field of view, identify the associated product, and the workstation processes a transaction involving the identified product, e.g., its purchase. In unauthorized usage, a dishonest employee may bypass the workstation in a criminal practice known in retailing as "sweethearting," which is the unauthorized giving-away of a product without charge, or at a reduced price, to a "sweetheart" customer, e.g., a friend, a family member, a fellow employee, etc. For example, the dishonest employee may deliberately pass the product outside the field of view, or may deliberately point the target away from the readers, or may deliberately place his or her thumb or hand over the target, all to prevent the target from being read.

To prevent such retail loss, common countermeasures include the physical supervision of the employees, the use of CCTV surveillance cameras, the checking by security guards of customer receipts at exits, and the installation of loss analytic software in a host server that monitors all the workstations. The loss analytic software may track which employees may ring up unusually high amounts of products known to be attractive to thieves, may track an unusual number of price overrides and exceptions, may track an unusual number of refunds or gift cards, and may track an unusual number of product voids, etc. However, the loss analytic software can only track what data is manually entered by the employee, and what targets have actually been read by the readers, at the workstations. The loss analytic software cannot track any target that has not been read, and thus cannot monitor all types of sweethearting activity.

Accordingly, it would be desirable to reliably track when a target of a product being passed through a workstation has not been read, and to discourage such sweethearting activity.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
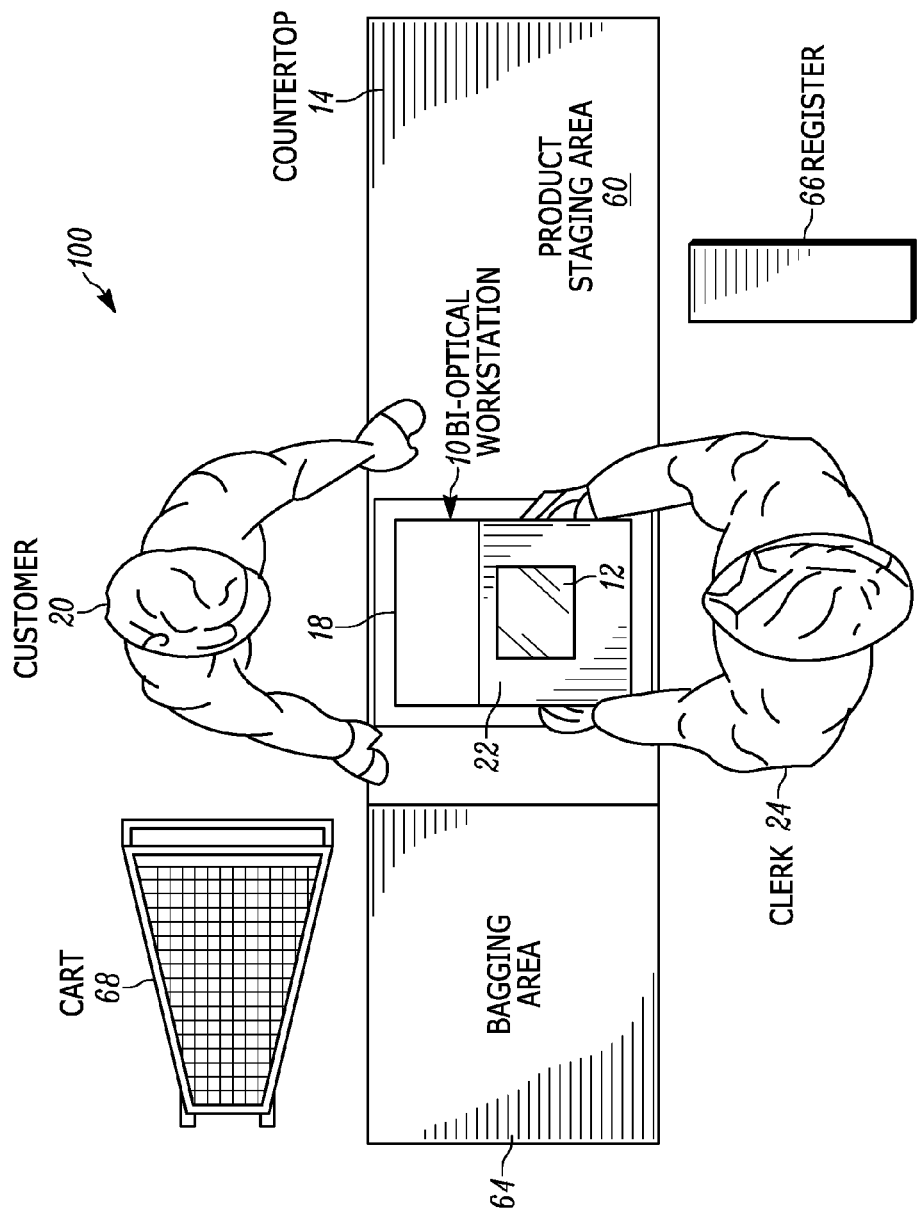
FIG. 1 is a top plan view of a retail checkout counter at which theft of a product passing through a dual window, bi-optical, point-of-transaction workstation is deterred in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The workstation, system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A system or workstation, in accordance with one feature of this disclosure, is operative for deterring theft of a product associated with a target, e.g., a bar code symbol, to be electro-optically read. The system includes a window, a motion detector, and a reader, all supported by a housing. The motion detector detects movement of the product outside and past the window. The reader electro-optically reads the target associated with the product moving past the window. Preferably, the reader includes an imaging assembly that looks for return light from the target associated with the moving product over a field of view in response to the movement detected by the motion detector. The imaging assembly captures the return light to electro-optically read the target by image capture when the target is found by the imaging assembly in the field of view. The system further includes a controller for determining for security investigation whether the product has moved past the window and whether the target associated with the moving product has not been electro-optically read. Thus, if an operator, such as a retail store employee, passes a product through the workstation without its associated target having been read, this is deemed a suspicious security event that requires further investigation to see if a sweethearting activity has occurred. Advantageously, the controller may also assign a time to the security event, and send the assigned time and the security event to a host for theft analysis.

Different workstation configurations are contemplated. When the workstation is configured as a vertical slot scanner, for example, the housing supports the window as a single upright window in an upright plane. When the workstation is configured as a flat-bed or horizontal scanner, for example, the housing supports the window as a single generally horizontal window in a generally horizontal plane. When the workstation is preferably configured as a dual window, bi-optical scanner, the housing has an upright tower that supports the window in an upright plane, and also has a generally horizontal platform that supports an additional window in a generally horizontal plane that intersects the upright plane.

Different target readers are contemplated. Preferably, the target is read by a solid-state imager having an array of image sensors looking at the field of view that extends through the window to the target to be read by image capture, and an energizable illumination assembly illuminates the field of view with illumination light over an illumination field. The controller energizes the illumination system in response to the detected movement of the product, and processes return illumination light returned from the target and captured in the field of view by the imager. Laser-based readers could also be employed.

Different motion detectors are contemplated. Preferably, the motion detector is light-based and includes at least one infrared (IR) emitter for emitting IR light into an IR emission field, and at least one IR sensor for sensing return IR light within an IR detection field that, preferably, but not necessarily, intersects the IR emission field in a zone outside the window of the workstation. The IR sensor is operative for detecting the entry of the product into the zone, the exit of the product from the zone, and the direction and movement of the product through the zone, by sensing a change in magnitude over time of the return IR light returned by the product. The controller determines whether the change in magnitude over time of the return IR light is indicative of a swipe mode, in which the product is swiped across the window. An analog output signal of the IR sensor has a shape that is indicative of this change in magnitude over time of the return IR light.

In accordance with another feature of this disclosure, a method of deterring theft of a product associated with a target to be electro-optically read, is performed by supporting a window on a housing, by detecting movement of the product outside and past the window, by electro-optically reading the target associated with the product moving past the window, and by determining for security investigation whether the product has moved past the window and whether the target associated with the moving product has not been electro-optically read.

Figure 2:
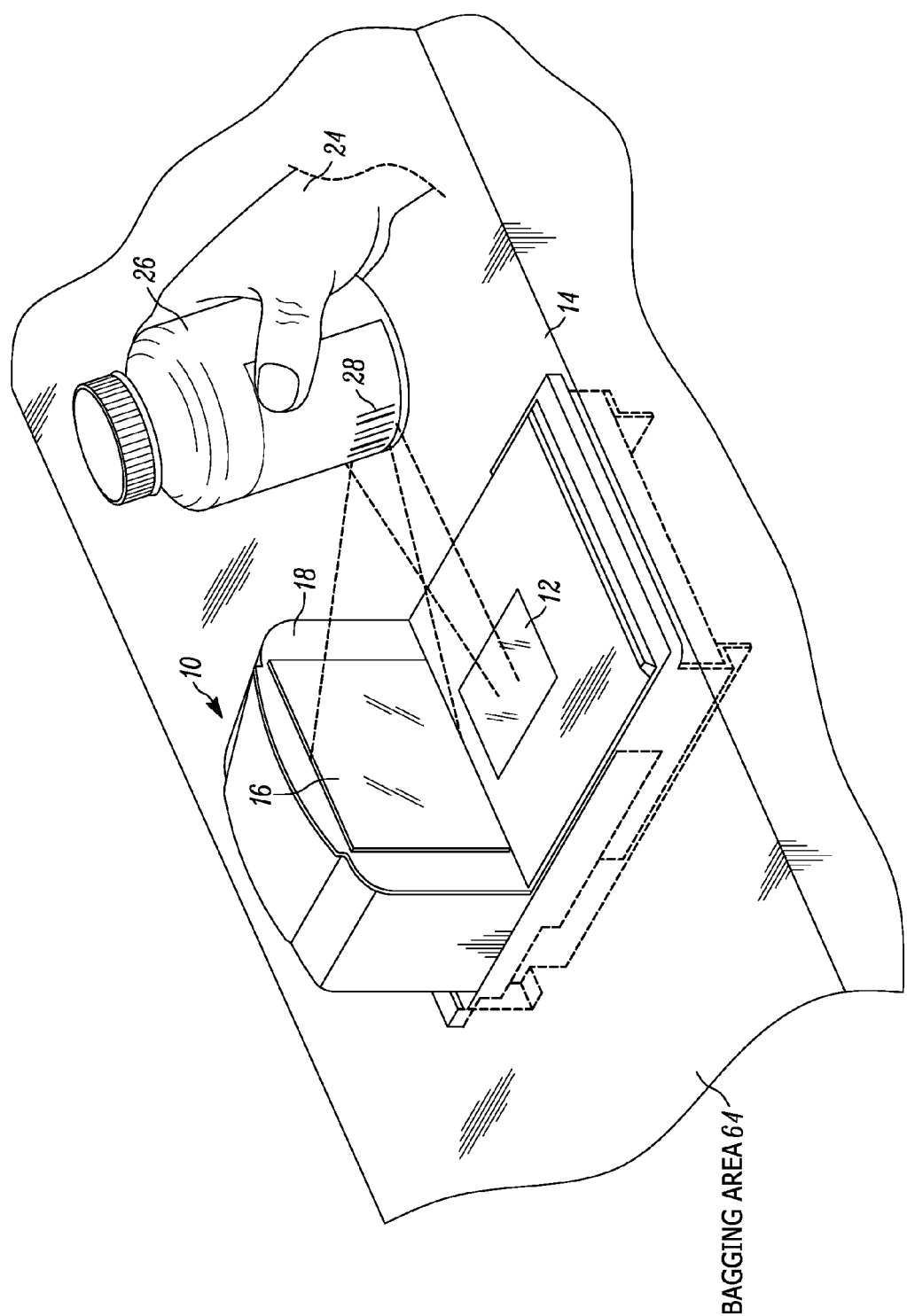
FIG. 2 is a broken-away, perspective view of the workstation of FIG. 1 depicting a target associated with the product being read during passage through the workstation.
Figure 3:
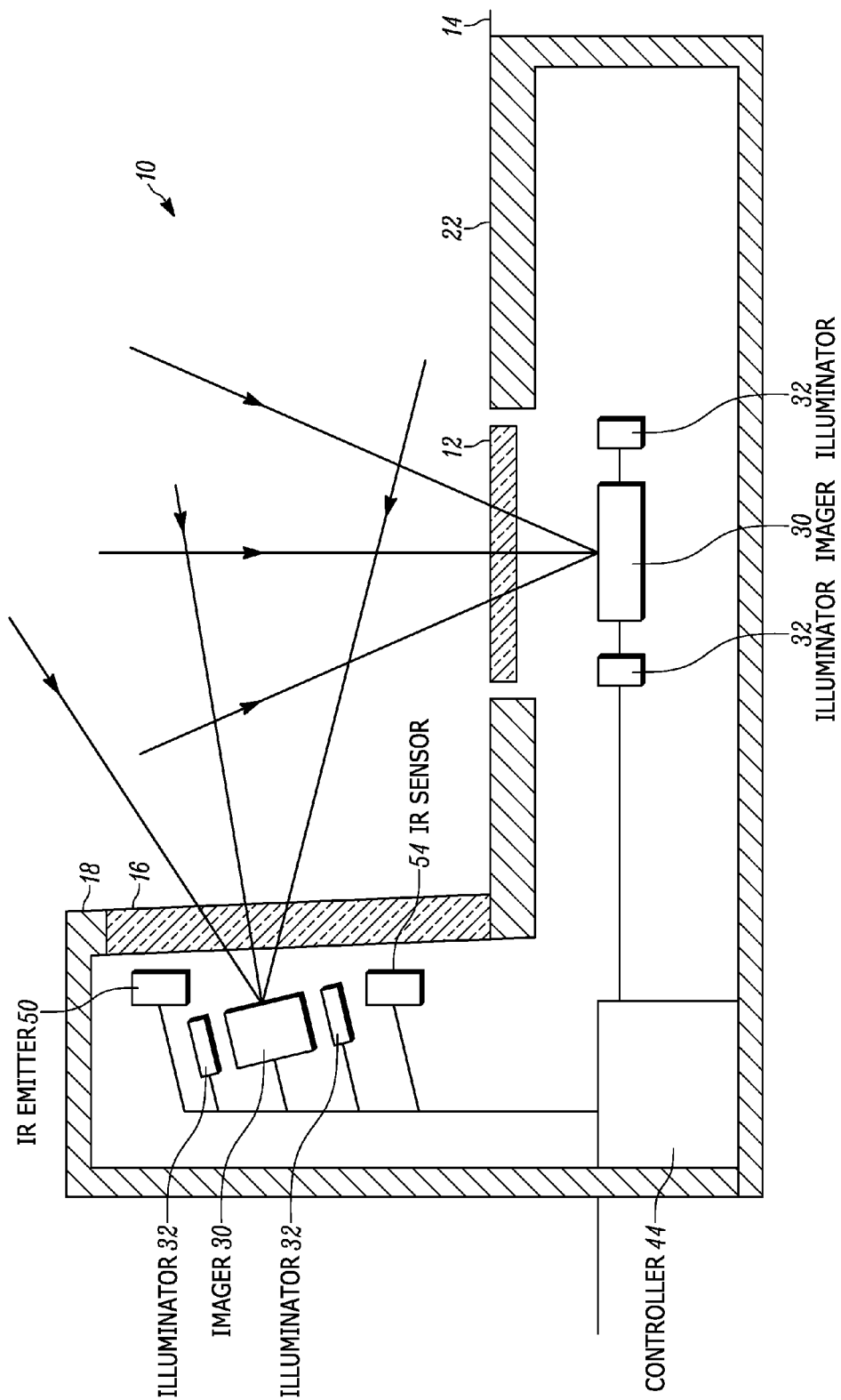
FIG. 3 is a part-sectional, schematic view of the workstation of FIG. 1 depicting components of imaging readers and of a motion detector in accordance with this disclosure.

Turning now to the drawings, a checkout counter 100, as depicted in FIG. 1, includes a dual window, bi-optical, point-of-transaction workstation 10 used by retailers to process a transaction involving the purchase of a product 26 (see FIG. 2) bearing, or associated with, an identifying target, such as a Universal Product Code (UPC) symbol 28. As best seen in FIGS. 2-3, the workstation 10 has a generally horizontal, planar platform or platter 22 for supporting a generally horizontal, preferably rectangular, planar window 12 located in a generally horizontal plane and elevated, or set flush with, a countertop 14, and a vertical or generally vertical (referred to as "upright" hereinafter), preferably rectangular, planar window 16 located in an upright plane and set flush with, or recessed into, a raised housing or tower portion 18 above the countertop 14. The upright plane may lie in a vertical plane, or be slightly rearwardly or forwardly inclined relative to the vertical plane. By way of numerical example, the generally horizontal window 12 may measure about four inches in width by about six inches in length, while the generally upright window 16 may measure about six inches in width by about eight inches in length. The workstation 10 either rests directly on the countertop 14, or preferably, as shown in FIGS. 2-3, rests in a cutout or well formed in the countertop 14.

Returning to FIG. 1, both of the windows 12, 16 are positioned to face and be accessible to a retail employee or clerk 24 standing at one side of the countertop 14 for enabling the clerk 24 to interact with the workstation 10, and with a cash register 66 to enable the clerk to receive payment for the purchased product 26. The register 66 may include a debit/credit card reader and a receipt printer to print a receipt. A keypad may also be provided at the register 66 to enable manual entry of information, such as an identifying code for any purchased product not bearing a symbol, by the clerk 24.

A product staging area 60 is located on the countertop 14 at one side of the workstation 10. All the products 26 to be purchased are placed on the product staging area 60 by a customer 20 standing at the opposite side of the countertop 14. The customer 20 typically retrieves the individual products 26 for purchase from a shopping cart 68 or basket for placement on the product staging area 60. A non-illustrated conveyor belt could be employed for conveying the products 26 to the clerk 24.

As schematically shown in FIG. 3, a data capture arrangement, advantageously including a plurality of imaging readers, each including a camera or solid-state imager 30 and a pair of energizable illuminators 32, is mounted at the workstation 10. Each imager 30 captures return light passing through either or both windows 12, 16 from the target 28 over an imaging field of view. In a preferred embodiment, the imaging field of each imager 30 may measure about 15 degrees by about 30 degrees. Each imager 30 is a solid-state device, preferably a one- or two-dimensional, charge coupled device (CCD) or a complementary metal oxide semiconductor (CMOS) device, having an array of image sensors (also known as pixels), preferably of megapixel size. Each imager 30 preferably has a global shutter. Each illuminator 32 preferably includes one or more light sources, e.g., surface-mounted, light emitting diodes (LEDs), located at each imager 30 to uniformly illuminate the target 28 with illumination light over an illumination field that overlaps the respecting imaging field of view. Each imager 30 includes an imaging lens assembly for capturing return illumination light reflected and/or scattered from the target 28, and for projecting the captured return illumination light onto the respective sensor array.

In authorized use, the clerk 24 processes the product 26 bearing the target 28 thereon, past the windows 12, 16 by swiping the product, e.g., in the direction from right-to-left in FIGS. 1-2, across a respective window 12, 16, or by presenting and momentarily holding the product 26 at the respective window 12, 16, before passing the product 26 to a bagging area 64 that is located at the opposite side of the workstation 10. The target 28 may located on any of the top, bottom, right, left, front and rear, sides of the product 26, and at least one, if not more, of the imagers 30 will capture the illumination light reflected, scattered, or otherwise returning from the target 28 through one or both windows.

FIG. 3 also schematically depicts that the imagers 30 and their associated illuminators 32 are operatively connected to a programmed microprocessor or controller 44 operative for controlling the operation of these and other components. Preferably, the controller 44 has an internal memory for storing data. The controller 44 is also tasked with processing the captured target images, and for decoding the return light scattered from the target 28 when the target is a symbol. A motion detector comprised of at least one infrared (IR) emitter 50 and at least one IR sensor 54 is also depicted in FIG. 3 and is operatively connected to, and controlled by, the controller 44. In operation, the motion detector detects the presence and the motion of the product 26 in a zone in the workstation 10, as described in detail below, and the controller 44 responsively sends successive command signals to the illuminators 32 to pulse the LEDs for a short time period of about 100 microseconds or less, and successively energizes the imagers 30 to collect light from the target 28 only during said time period, also known as the exposure time period. By acquiring a target image during this brief time period, the image of the target 28 is not excessively blurred even in the presence of relative motion between the imagers 30 and the target 28.

Figure 4:
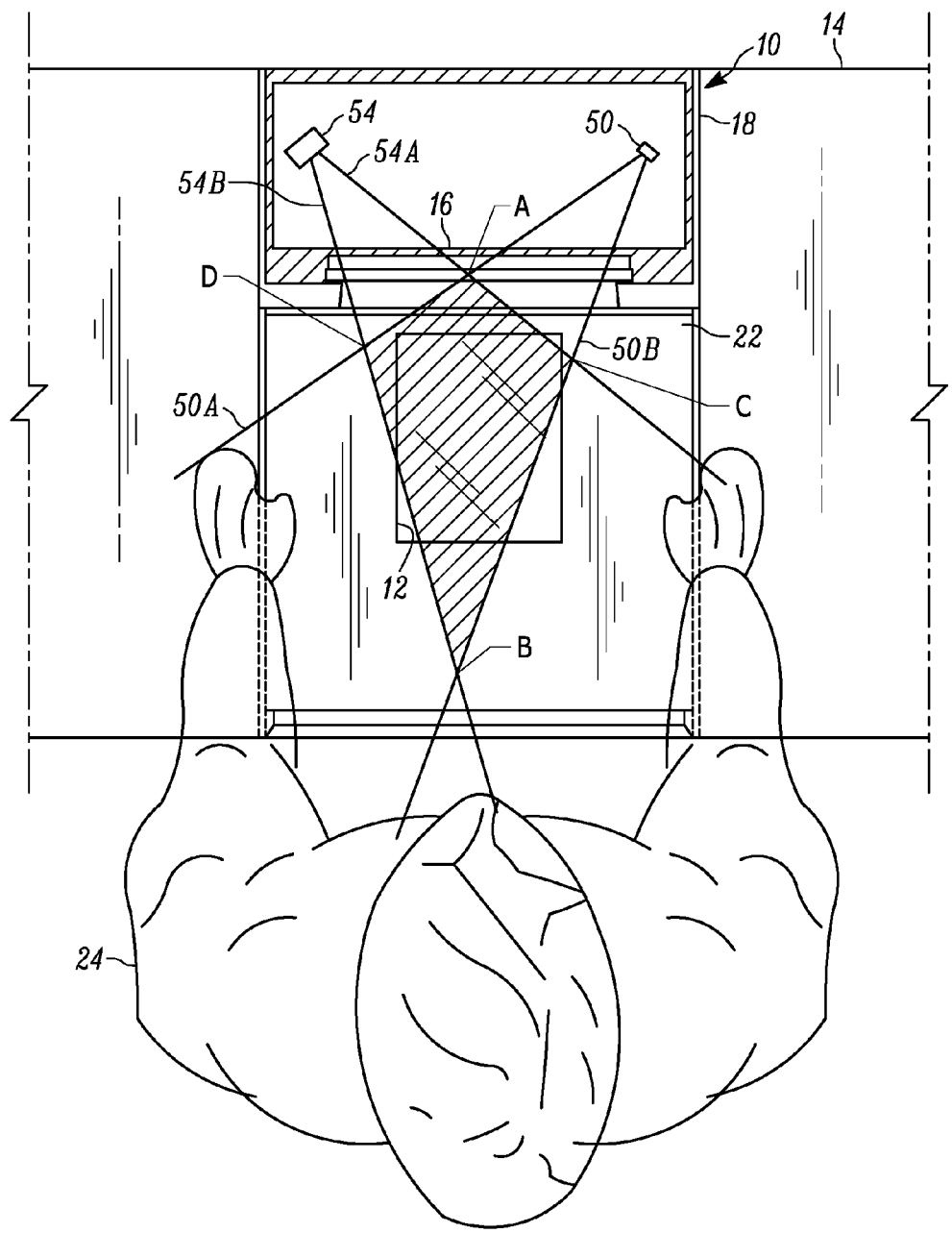
FIG. 4 is a part-sectional, overhead view of the workstation of FIG. 1 depicting the motion detector in accordance with this disclosure for detecting movement of the product through the workstation.

A preferred embodiment of the motion detector is shown in FIG. 4, wherein the imagers 30 and the illuminators 32 have been removed for clarity. The motion detector is preferably light-based and the IR emitter 50 is preferably comprised of one or more light emitting diodes (LEDs), for emitting IR light into an IR emission field bounded by side boundary edges 50A, 50B, and the IR sensor 54 senses return IR light within an IR detection field bounded by side boundary edges 54A, 54B. Although only one IR emitter 50 and only one IR sensor 54 are shown in FIG. 4, it will be understood that two or more such IR emitters 50 and two or more such IR sensors 54 could be installed in the workstation. The emitted IR light has its maximum intensity along an IR emission axis centrally located within the IR emission field. The return IR light has its maximum sensitivity along an IR detection axis centrally located within the IR detection field. The IR axes are preferably, but not necessarily, inclined and cross over and intersect one another directly in front of the upright window 16. The IR detection field intersects the IR emission field in a common area of intersection (shown by a quadrilateral area highlighted by hatched lines in FIG. 4 and having corners A, B, C, D) to define the aforementioned zone directly in front of the upright window 16. In the illustrated bi-optical configuration, the zone is also directly above, and is generally coextensive in area with, the generally horizontal window 12. The intersecting IR emission and detection fields above the horizontal window 12 and/or the platform 22 within the workstation 10, reduce false triggering by the motion detector, not only by the clerk 24 outside the workstation 10, but also by items or parts of the clerk 24 inside the workstation 10, but not in the predetermined zone A, B, C, D, e.g., directly overlying the generally horizontal window 12. As shown in FIG. 4, no part of the clerk 24 is in the zone.

The IR sensor 54 is operative for detecting an entry of each successive product 26 into the zone, an exit of each successive product 22 from the zone, as well as the direction and motion of each successive product 26 through the zone outside and past the windows 12, 16. In the preferred embodiment, the IR sensor 54 senses a change in magnitude over time, i.e., the shape or slope, of the return IR light returned by each successive product 26.

In accordance with this disclosure, the controller 44 determines for security investigation whether the product 26 has indeed moved past at least one of the windows 12, 16 and whether the target 28 associated with the moving product 26 has not been electro-optically read. If so, then this is deemed, and flagged as, a suspicious security event that requires further investigation to see if a sweethearting activity has occurred. Advantageously, the controller 44 may also assign a time to the security event, and send the assigned time and the security event to a host for theft analysis. The controller 44 may preferably keep a record-keeping log in its memory of each such security event to track for patterns of suspicious sweethearting activity.

Sometimes, the clerk 24 can swipe the product 26 without the target 28 having been read. For example, the clerk might quite innocently, not present the target correctly, or might fumble the product, or the target might be damaged, etc. To prevent such events from being deemed suspicious and flagged for a security investigation, the controller 44 is further operative for determining a preferred direction of movement of the product 26, and for recognizing a security event requiring the security investigation if the direction of movement has not been changed after a predetermined time period. More particularly, the controller 44 may recognize that the clerk 24 prefers to swipe the products from right-to-left. If a target has not been read during a right-to-left swipe, then the controller 44 will look to see if the next swipe attempt, during a time period of about two seconds or so, is in the reverse left-to-right direction. If so, and the target was read during this next attempt, then the controller 44 will not flag the previous non-read as suspicious.

Figure 5:
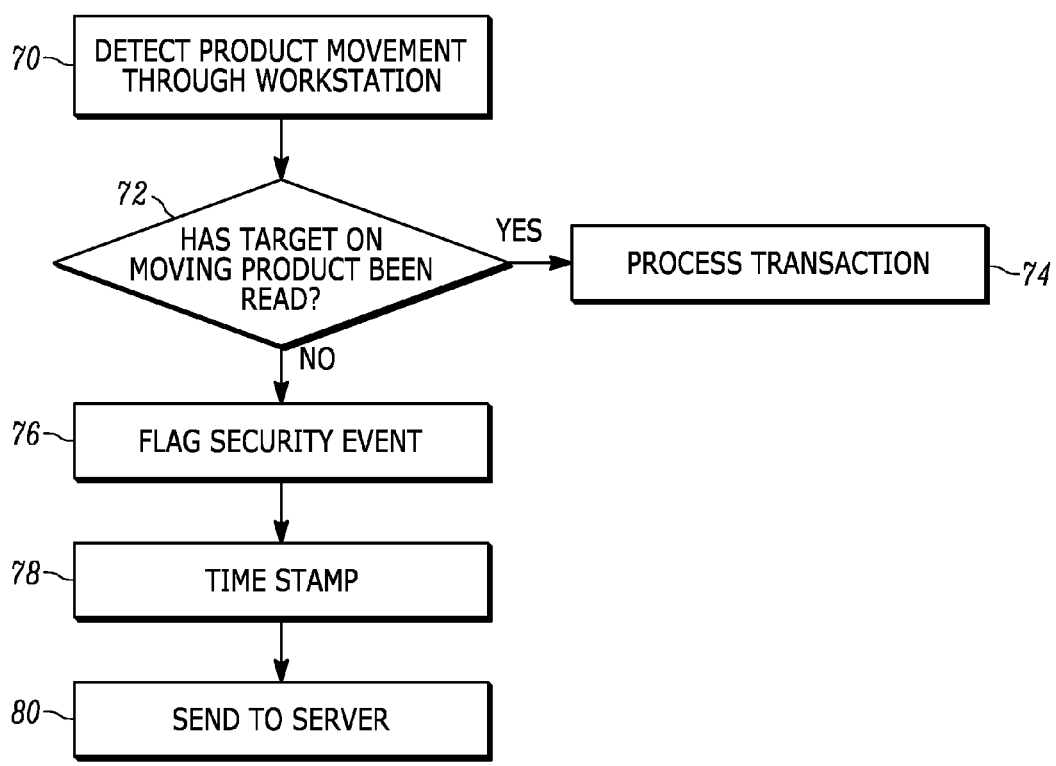
FIG. 5 is a flow chart of steps performed in a method of deterring theft in accordance with this disclosure.

FIG. 5 is a flow chart depicting steps performed in the method of deterring theft of this disclosure. In step 70, the movement of the product 26 outside and past the windows 12, 16 is detected, and, in step 72, the target associated with the moving product 26 is attempted to be electro-optically read. If the reading is successful, then the transaction is processed in step 74. If the reading was unsuccessful, then this is deemed and flagged as a suspicious security event requiring investigation in step 76. The controller 44 may time-stamp the security event in step 78, and may send the time-stamped security event to a host server in step 80 for further investigation.

It will be understood that each of the elements described above, or two or more together, also may find a useful application in other types of constructions differing from the types described above. For example, the workstation 10 need not be the illustrated bi-optical workstation having dual presentation windows as described above, but could also be configured either as a stand-mounted scanner having a single presentation window, or as a vertical slot scanner having a single upright presentation window, or as a flat-bed or horizontal slot scanner having a single, generally horizontally arranged presentation window. The target 28 need not be the illustrated one-dimensional symbol, but could also be a truncated symbol, a stacked symbol, or a two-dimensional symbol, as well as a non-symbol target, such as a driver's license, a receipt, a signature, etc. The workstation 10 need not have the illustrated two imagers 30, but could have more or less than two imagers, and one or all of the imagers could be replaced by laser-based readers. The motion detector need not be light-based. Also, the IR emission axis and the IR detection axis need not cross over as illustrated, but could also be positioned in mutual parallelism and extend perpendicularly of the upright window 16. The motion detector could also be comprised of a plurality of sets of IR emitters 50 and IR sensors 54. For example, one set could be provided at one side of the workstation 10, and another set could be provided at an opposite side of the workstation 10.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having,"

"includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for deterring theft of a product associated with a target to be electro-optically read, the system comprising:
   a housing;
   a window supported by the housing;
   a motion detector supported by the housing, and operative for detecting movement of the product outside and past the window;
   a reader supported by the housing, and operative for electro-optically reading the target associated with the product moving past the window; and
   a controller operatively connected to the reader and the motion detector, and operative for determining a preferred direction of movement of the product, and
   for recognizing a security event if:
      the product has moved past the window in the preferred direction and the target associated with the product has not been electro-optically read; and
      the product has not moved past the window in an opposite direction of the preferred direction within a predetermined time period.

2. The system of claim 1, wherein the reader includes an imaging assembly for looking for return light from the target associated with the moving product over a field of view in response to the movement detected by the motion detector, and wherein the imaging assembly is operative for capturing the return light to electro-optically read the target by image capture when the target is found by the imaging assembly in the field of view.

3. The system of claim 2, wherein the imaging assembly includes a solid-state imager having an array of image sensors looking at the field of view that extends through the window to the target, and an energizable illumination assembly for illuminating the field of view with illumination light over an illumination field; and wherein the controller is operative for energizing the illumination assembly in response to the movement detected by the motion detector, and for processing return illumination light returned from the target and captured in the field of view by the imager.

4. The system of claim 1, wherein the housing supports the window in an upright plane, and wherein the housing supports an additional window in a generally horizontal plane that intersects the upright plane.

5. The system of claim 1, wherein the motion detector includes an infrared (IR) emitter for emitting IR light into an IR emission field, and an IR sensor for sensing return IR light within an IR detection field; and wherein the IR sensor is operative for detecting the movement of the product by sensing a change in magnitude over time of the return IR light returned by the product.

6. The system of claim 1, wherein the controller is operative for assigning a time to the security event, and for sending the assigned time and the security event to a host for theft analysis.

7. A point-of-transaction workstation for deterring theft of a product associated with a target to be electro-optically read, the workstation comprising:
   a housing for supporting an upright window in an upright plane, and a generally horizontal window in a generally horizontal plane that intersects the upright plane, the windows bounding a zone through which the product passes through the workstation;

a motion detector supported by the housing, and operative for detecting movement of the product outside and past the windows;

an imaging assembly supported by the housing, and operative for looking for return light from the target associated with the moving product over a field of view in response to the movement detected by the motion detector, the imaging assembly being operative for capturing the return light through at least one of the windows to electro-optically read the target by image capture when the target is found by the imaging assembly in the field of view; and a controller operatively connected to the imaging assembly and the motion detector, and operative
for determining a preferred direction of movement of the product, and
for recognizing a security event if:
the product has moved past the window in the preferred direction and the target associated with the product has not been electro-optically read; and
the product has not moved past the window in an opposite direction of the preferred direction within a predetermined time period.

8. The workstation of claim 7, wherein the imaging assembly includes a solid-state imager having an array of image sensors looking at the field of view that extends through at least one of the windows to the target, and an energizable illumination assembly for illuminating the field of view with illumination light over an illumination field; and wherein the controller is operative for energizing the illumination assembly in response to the movement detected by the motion detector, and for processing return illumination light returned from the target and captured in the field of view by the imager.

9. The workstation of claim 7, wherein the motion detector includes an infrared (IR) emitter for emitting IR light into an IR emission field, and an IR sensor for sensing return IR light within an IR detection field; and wherein the IR sensor is operative for detecting the movement of the product by sensing a change in magnitude over time of the return IR light returned by the product.

10. The workstation of claim 7, wherein the controller is operative for assigning a time to the security event, and for sending the assigned time and the security event to a host for theft analysis.

11. A method of deterring theft of a product associated with a target to be electro-optically read, the method comprising:

supporting a window on a housing;
determining a preferred direction of movement of the product;
detecting movement of the product outside and past the window;
electro-optically reading the target associated with the product moving past the window; and
recognizing a security event if:
the product has moved past the window in the preferred direction and the target associated with the product has not been electro-optically read; and
the product has not moved past the window in an opposite direction of the preferred direction within a predetermined time period.

12. The method of claim 11, wherein the reading is performed by looking for return light from the target associated with the moving product over a field of view in response to the detected movement, and by capturing the return light to electro-optically read the target by image capture when the target is found in the field of view.

13. The method of claim 12, and illuminating the field of view with illumination light over an illumination field in response to the detected movement, and processing return illumination light returned from the target and captured in the field of view.

14. The method of claim 11, and supporting the window in an upright plane, and supporting an additional window in a generally horizontal plane that intersects the upright plane.

15. The method of claim 11, wherein the detecting is performed by emitting infrared (IR) light into an IR emission field, and by sensing return IR light within an IR detection field; and wherein the detecting is performed by sensing a change in magnitude over time of the return IR light returned by the product.

16. The method of claim 11, and assigning a time to the security event, and sending the assigned time and the security event to a host for theft analysis.

\* \* \* \* \*